Dec. 11, 1923.  A. B. CUBBAGE ET AL  1,477,038
CAMERA
Filed June 9, 1921
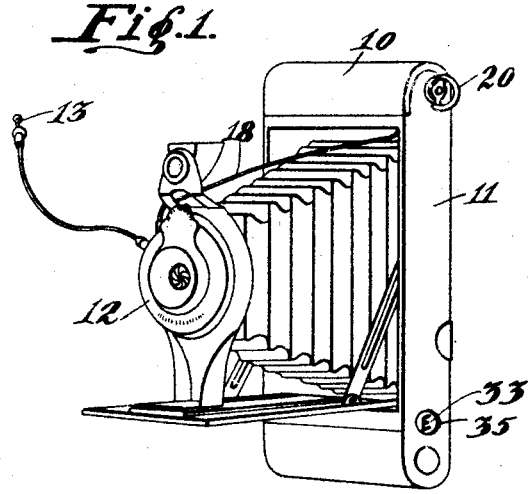
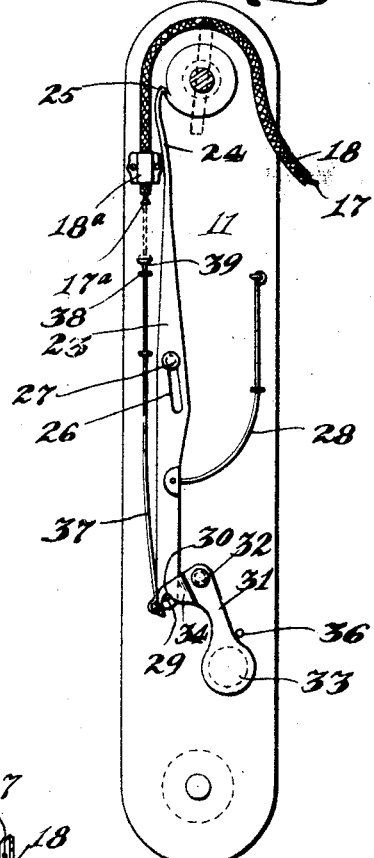
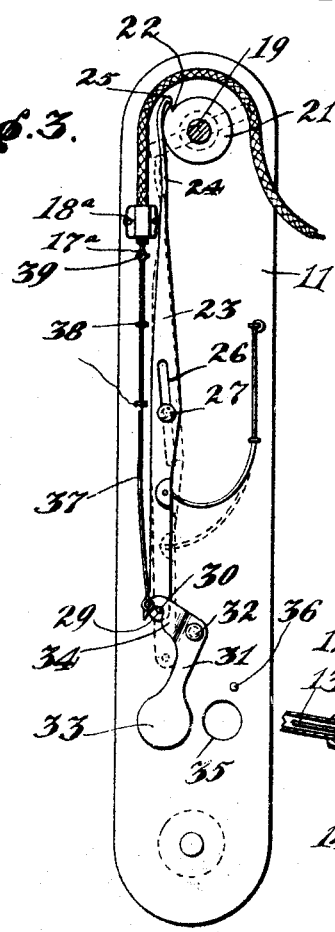
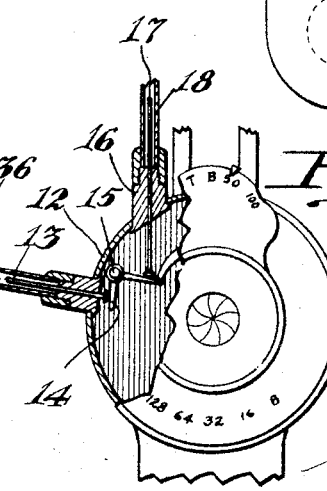
Inventor
A. B. Cubbage,
Herman Millman,
By
Attorney Patented Dec. 11, 1923.

1,477,038

UNITED STATES PATENT OFFICE.

ARTHUR B. CUBBAGE, OF LOS ANGELES, CALIFORNIA, AND HERMAN MILLMAN, OF NEW YORK, N. Y.

CAMERA.

Application filed June 9, 1921. Serial No. 476,273.

*To all whom it may concern:*

Be it known that we, ARTHUR B. CUBBAGE, a citizen of the United States, residing at Los Angeles, in the county of Los Angeles, State of California, and HERMAN MILLMAN, a citizen of the United States, residing at Bronx, in the county of New York, State of New York, have invented new and useful Improvements in Cameras, of which the following is a specification.

Our invention relates generally to cameras, and more particularly to an attachment for a hand or pocket camera that will serve to indicate to the operator the condition of the film that is positioned to the rear of the lens of the camera, that is, said attachment will indicate whether or not the film immediately to the rear of the lens has been exposed, thereby avoiding double exposure on the same film and likewise eliminating the necessity for turning the film in the event that the operator is not certain as to whether or not the film to the rear of the lens has been exposed.

It will be understood that in the use of hand or pocket cameras it very frequently happens that after making three or four exposures on a roll of film the camera is laid aside or not used for several days and when the camera is again brought into use the operator is not always certain as to the condition of the film immediately to the rear of the lens, and the result is either a double exposure or a loss of a film due to the winding up of the film roll by the operator, so as to insure the bringing of an unexposed film in position behind the lens.

It is the principal object of our invention to provide simple and efficient means for eliminating the uncertainty as to the condition of the film that is positioned behind the lens of the camera, and to accomplish these desirable results we arrange on the interior of the camera a simple and compact attachment that co-operates with the shutter actuating mechanism and which will serve to positively indicate to the user of the camera whether or not the film to the rear of the lens has been exposed.

Further objects of our invention are to provide an indicating device of the character described that is of relatively simple structure, capable of being easily and cheaply produced, and applicable for use upon all forms of hand or pocket cameras.

With the foregoing and other objects in view, our invention consists in certain novel features of construction and arrangement of parts that will hereinafter be more fully described and claimed, and illustrated in the accompanying drawings, in which Figure 1 is a perspective view of a hand camera with an indicating device of our improved construction applied thereto.

Figure 2 is an elevational view of the inner face of one of the side walls of the camera and to which our improved indicating device is applied.

Figure 3 is an elevational view similar to Figure 2 and showing the parts of the indicating device in non-indicating positions.

Figure 4 is a front elevational view of the combined lens and shutter of a camera and showing a portion thereof broken away and in section to illustrate the actuating mechanism for our improved indicating attachment.

Referring by numerals to the accompanying drawings, 10 designates the housing of an ordinary hand camera, 11 the side wall thereof and which carries our improved indicating device, 12 the housing for the lens and shutter, and 13 the usual flexible member or cable that is utilized for actuating the shutter.

Our improved indicating attachment includes a bell crank 14 that is turnable upon a pinion 15 that is seated in the lens and shutter housing 12, said bell crank being arranged so that one of its arms is directly in the path of travel of the flexible shutter operating member 13.

Arranged for sliding movement in a bearing 16 in the annular wall of housing 12 is a flexible member 17, the end portion of which extends into the chamber within said housing 12 and terminating at a point directly above the arm of bell crank 14 opposite the arm that is engaged by flexible member 13. Flexible member 17 extends through a flexible conduit 18 and said member and conduit extend to the upper portion of side wall 11 upon which the major portion of our indicating device is located. The end of flexible conduit 18 is seated in a retaining clip 18ª that is fixed on the inner face of wall 11 and the corresponding end portion of flexible member 17 projects beyond the fixed end of said conduit and terminates in a head or button 17ª. Flexible member 17 and conduit 18 are of sufficient length to extend from said side wall 11 to the housing 12 when the latter is in full open position, as illustrated in Figure 1, and when the movable parts of the camera including the bellows are folded into the housing 10, said flexible member 17 and conduit 18 fold readily into the space immediately above and in front of the bellows.

Journaled in suitable bearings in the upper portion of housing 10 and extending through side wall 11 is the shaft 19 that carries the spool onto which the exposed portion of the film is wound and the outer end of said shaft 19 carries the usual winding key 20. Fixed on the shaft 19 immediately adjacent to the inner face of side wall 11 is a disc 21 in the periphery of which is formed a notch 22.

Arranged immediately adjacent to the inner face of side wall 11 below and to one side of the shaft 19 is an elongated plate 23, preferably of thin metal, the upper portion of which is made relatively narrow to form a yieldingly or resilient finger 24 and the upper end thereof terminates in a hook 25 that is adapted to engage notch 22. Formed through the intermediate portion of plate 23 is a slot 26 that is inclined slightly with respect to a vertical plane and seated in side wall 11 and projecting through this inclined slot is a headed pin or rivet 27.

Secured in any suitable manner to the inner face of wall 11 to one side of plate 23 is the upper portion of a spring 28, preferably formed of wire, and the lower end portion of which is pivotally secured in any suitable manner to plate 23 at a point below slot 26 therein. Projecting inwardly from the lower end of plate 23 is a pin 29 that is adapted to engage in a notch 30, which latter is formed in the underside of the short arm of a bell crank 31. This bell crank is fulcrumed on a pin 32 that is seated in the wall 11 and the lower portion of the long arm of said bell crank terminates in a disc 33, the outer face of which bears the letter "E" or the letters "ex" or some similar abbreviation of the word "exposed."

Formed on the underside of the short arm of bell crank 31 immediately to the rear of notch or recess 30 therein is a depending hook 34 having a curved lower edge that is adapted to engage the pin 29 at a certain point in the operation of the device, as will be hereinafter more fully described.

Formed through the lower portion of wall 11 is aperture 35 through which the marked outer face of disc 33 may be viewed when the bell crank has been shifted so as to position said disc immediately to the rear of said aperture.

Arranged adjacent to and above aperture 35 is a pin 36 that serves as a stop to insure the proper positioning of the disc 33 when the same is shifted into postion immediately behind said aperture 35. Pivotally connected to the end of the short arm of bell crank 31 beyond the notch 30 therein is the lower end of a resilient rod 37, preferably of wire, the upper portion of which is arranged for sliding movement through eyelets 38 that are seated in wall 11 adjacent to the upper portion of plate 23, and the upper end of this rod terminates in a head 39 that is adapted to be engaged by the head 17ª on the end of flexible member 17 when the latter is moved lengthwise through the conduit 18.

The operation of our improved indicating device is as follows: Under normal conditions or if an exposure has been made and the exposed film has been properly wound onto the spool carried by shaft 19, the plate 23 will occupy the position illustrated by dotted lines in Figure 3, and bell crank 31 and resilient rod 37 will occupy the positions as illustrated by solid lines in Figure 3. Sliding plate 23 will be retained in such normal position or at its lowermost limit of movement upon supporting pin 27 by the action of the lower portion of spring 28 and when so positioned the pin 29 at the lower end of the sliding plate is positioned a substantial distance below the notched short arm of bell crank 31. This bell crank 31 was on the preceding upward movement of sliding plate 23 shifted so that the marked disc 33 is offset from and not visible through aperture 35, and consequently the operator noting the absence of the marked disc from aperture 35 will understand that the exposed film has been properly wound onto the spool carried by shaft 19 and that an unexposed film is positioned immediately to the rear of the camera lens and shutter.

To make an exposure, the outer end of flexible member 13 is pressed to cause the member 13 to advance in its conduit in the usual manner and which movement swings the bell crank 14 on its fulcrum, thereby opening the shutter to make the exposure and simultaneously moving the flexible member 17 through its conduit 18. As such action takes place the head or button 17ª on the end of flexible member 17 will bear against the head 39 on the upper end of resilient rod 37, thereby moving the last mentioned member downwardly through its bearings, and consequently swinging bell crank 31 on its fulcrum so that the marked indicating disc 33 will be swung into position immediately behind the aperture 35 in which position it will remain until the exposed film has been wound onto the film receiving spool by proper rotation of shaft 19.

As bell crank 31 is thus shifted into indicating position, the curved edge of portion 34 of the short arm of said bell crank will as said short arm moves downward bear against pin 30 projecting from the lower portion of plate 23 and swing said plate slightly on its fulcrum, which slight swinging movement continues until pin 29 passes into the notch or recess 30. This slight swinging movement of plate 23 moves the hook 25 on its upper end directly against the periphery of disc 21 or in such position as to be engaged by the shoulder adjacent to notch 22 when said disc is rotated with winding shaft 19.

The parts of the indicating device thus shifted to indicating position will retain such position until released by rotary motion imparted to shaft 19, so that if the operator forgets to wind an exposed portion of the film onto the receiving spool the fact that an exposed portion of film lies directly behind the lens of the camera will be indicated by the marked plate 33 through the aperture 35 when the camera is again made ready for use, and consequently double exposures and the winding of an unexposed section of film onto the receiving spool due to uncertainty as to whether or not said film is exposed will be eliminated.

If, exposure has been made and the parts of the indicating device occupy the positions as illustrated in Figure 2, and when the operator immediately rotates shaft 19 to wind the exposed portion of the film upon the receiving spool the shoulder adjacent to notch 22 in disc 21 will as said disc is rotated engage the hook 25 on the upper end of plate 23, thereby elevating said plate against the resistance offered by spring 28 and which movement swings the bell crank 41 upon its fulcrum, so as to move the marked disc 33 away from the indicating position directly behind aperture 35 into the position illustrated by solid lines in Figure 3.

As disc 21 has been rotated a sufficient distance to elevate plate 23 and move the bell crank 31 into non-indicating position, said plate 23 will occupy the position illustrated by solid lines in Figure 3 and immediately the shoulder adjacent to notch 22 passes or disengages from hook 25 the tension in the lower portion of spring 28 will act to move plate 23 downward to its limited movement or to the position indicated by dotted lines in Figure 3, whereupon winding or rotary movement may be imparted to shaft 19, so as to completely wind the exposed portion of the film upon the receiving spool carried by said shaft. When the exposed portion of the film has been thus wound onto the receiving spool, the parts of the indicating device will be properly positioned for the succeeding exposure at which time the resilient rod 37 will be moved downward to actuate bell crank 31 and position pin 29 in notch 30. Rod 37 is formed of resilient material, preferably wire, in order that its lower portion will yield readily to arcuate path of travel of the short arm of bell crank 31, and the upper portion 29 of plate 23 is made resilient in order that the hook 25 at the upper end of said plate may yield slightly outward so as to pass the shoulder or high portion of edge of disc 21 immediately adjacent to notch 22.

An indicating device of our improved construction is comparatively simple, entirely automatic in operation, is positive in action, occupies very little space within the camera, adds no appreciable weight to said camera, and is very effective in indicating to the operator of the camera the exposed or unexposed condition of the film that is positioned immediately to the rear of the lens and shutter.

While we have shown and described a relatively simple and practical form of indicating device embodying our invention, it will be understood that numerous changes in the size, form, and construction of the various parts of the device may be made and substituted for those herein shown and described without departing from the spirit of our invention, the scope of which is set forth in the appended claims.

We claim as our invention:

1. In a camera, a shutter-actuating device, a film-winding roller, a casing enclosing said roller having a sight opening, an arm pivoted to swing to and from a position opposite said sight opening, means operated by said shutter-actuating device for swinging said arm to a position opposite the sight opening, a slidable plate, means on said plate engageable with said lever, and means for detachably connecting said plate to said film roller whereby said plate may be moved on turning the roller to thereby move said lever to a position away from the sight opening.

2. In a camera, a shutter-actuating device, a film-winding roller, a casing enclosing said roller having a sight opening, an arm pivoted to swing to and from a position opposite said sight opening, means operated by said shutter-actuating device for swinging said arm to a position opposite the sight opening, a slidable plate, means on said plate engageable with said lever, means for detachably connecting said plate to said film roller whereby said plate may be moved on turning the roller to thereby move said lever to a position away from the sight opening, means whereby said plate will be automatically disengaged from said roller on partial revolution of the latter, and yieldable means operable to move said plate to an inoperative position relative to said roller on its being operatively disengaged therefrom.

3. In a camera, a shutter-actuating device, a film-winding roller, a casing enclosing said roller having a sight opening, an arm pivoted to swing to and from a position opposite said sight opening, means operated by said shutter-actuating device for swinging said arm to a position opposite the sight opening, a slidable plate, means on said plate engageable with said lever, means for detachably connecting said plate to said film roller whereby said plate may be moved on turning the roller to thereby move said lever to a position away from the sight opening, means whereby said plate will be automatically disengaged from said roller on partial revolution of the latter, yieldable means operable to move said plate to an inoperative position relative to said roller on its being operatively disengaged therefrom, and means operable by movement of said indicating lever under action of said shutter-actuating device for disposing said plate in operative relation to said roller.

4. In a camera, a camera casing having a sight opening, a shutter, an actuating device for said shutter, a swinging arm adapted to be disposed in and out of a position opposite said sight opening, a resilient rod connected to said arm, means whereby operation of the shutter-actuating device will act on said rod to swing said arm into position opposite the sight opening, a film-receiving roller, a slidable plate formed with a slot, a pin projecting through said slot forming a guide for said plate and serving to limit the movement thereof in either direction, a hook on said plate, a disk on said roller having a shoulder engageable with said hook when the latter is disposed in operative relation thereto, a spring acting on said plate to normally position the hook thereon out of operation with the shoulder on the disk, and means operable on swinging of said arm under action of the shutter-actuating device for shifting said plate into operative relation with said shoulder whereby on rotation of said roller the plate may be moved longitudinally in opposition to the spring, and means operable by such movement of the plate for rocking the arm to a non-indicating position.

ARTHUR B. CUBBAGE.
HERMAN MILLMAN.